US008477012B2

(12) United States Patent
Kato (10) Patent No.: US 8,477,012 B2
(45) Date of Patent: Jul. 2, 2013

(54) BIOMETRIC AUTHENTICATION APPARATUS

(75) Inventor: Atsushi Kato, Seto (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 699 days.

(21) Appl. No.: 12/763,166

(22) Filed: Apr. 19, 2010

(65) Prior Publication Data

US 2010/0265040 A1    Oct. 21, 2010

(30) Foreign Application Priority Data

Apr. 21, 2009    (JP) ................................. 2009-102992

(51) Int. Cl.
  *G05B 19/00*    (2006.01)
(52) U.S. Cl.
  USPC ......... 340/5.83; 340/5.8; 340/5.81; 340/5.82; 340/5.52; 340/5.53; 382/124; 382/125; 382/126; 382/127
(58) Field of Classification Search
  USPC ....................................................... 340/5.83
  See application file for complete search history.

(56) References Cited

U.S. PATENT DOCUMENTS

| | | | |
|---|---|---|---|
| 7,102,486 B2 * | 9/2006 | Yamagishi | 340/5.53 |
| 7,184,576 B2 * | 2/2007 | Kono et al. | 382/115 |
| 7,337,469 B2 * | 2/2008 | Osada et al. | 726/19 |
| 2005/0047632 A1 | 3/2005 | Miura et al. | |
| 2009/0092296 A1 * | 4/2009 | Yokoyama et al. | 382/124 |

FOREIGN PATENT DOCUMENTS

| | | |
|---|---|---|
| EP | 1 654 984 A2 | 5/2006 |
| JP | 2003-187235 A | 7/2003 |
| JP | 2005-128935 A | 5/2005 |

OTHER PUBLICATIONS

European Patent Office extended European search report on Application No. 10160312.4 dated Jul. 5, 2010; 4 pages.

* cited by examiner

*Primary Examiner* — George Bugg
*Assistant Examiner* — Matthew Taylor
(74) *Attorney, Agent, or Firm* — Foley & Lardner LLP (57) ABSTRACT

An apparatus acquires information on a user's finger veins for personal authentication and includes: guides which form a space to put the user's finger in and block external light to come into the space sideways; a door assembly which closes when the user's finger is not in place and opens downward by a pushing force of the user's finger when the user's finger is in place, and blocks external light from above the space; a light source section disposed on a surface of the door assembly surface for irradiating the user's finger with light; a filter located at a space bottom and having a reflective surface for reflecting external light coming into the space or light from the light source section; and an imaging unit located under the filter for taking an image of veins of the user's finger exposed to the light emitted from the light source section.

11 Claims, 8 Drawing Sheets

BIOMETRIC AUTHENTICATION APPARATUS

CLAIM OF PRIORITY

The present application claims priority from Japanese application serial no. JP2009-102992, filed on Apr. 21, 2009, the content of which is hereby incorporated by reference into this application.

FIELD OF THE INVENTION

The present invention relates to biometric authentication apparatuses and more particularly to a biometric authentication apparatus which performs authentication by finger vein check.

BACKGROUND OF THE INVENTION

Normally, when biometric authentication is performed by checking finger veins, a user puts his/her finger on an area surrounded by the guides of an authentication apparatus (transparent plate of plastic or similar material) and the finger is irradiated with light of a prescribed wavelength from light sources provided on the guides and an image of the finger thus irradiated is taken by a camera, etc. The vein pattern of the finger is read with a scanner, etc. to obtain an image of the vein pattern. Then, whether or not the image of the read vein pattern coincides with a previously registered vein pattern is checked for personal authentication.

When the above method is used for personal authentication, it is desirable that external light including natural light such as sunlight and ambient light such as light from lamps, and light from the light sources which impinges on the finger, should not enter the area surrounded by the guides. The reason is that such light is reflected by the transparent plate and the reflected light may show up in a camera image of the user's finger, causing the camera image to be blurred and resulting in deterioration in personal authentication accuracy.

As a technique for eliminating the possibility of unwanted light showing up in a camera image, JP-A No. 2005-128935 discloses an authentication apparatus which uses a lid to cover the user's finger to block external light, etc. However, according to the technique described in JP-A No. 2005-128935, the lid is so shaped as to cover the user's finger entirely, which may make the user nervous and psychologically stress the user.

As a technique for easing the user's psychological stress, JP-A No. 2003-187235 discloses an authentication apparatus which uses guides for surrounding only the lateral faces of the finger instead of the above lid in order to block external light coming from both the lateral faces of the finger and reduce the possibility of reflected light showing up in a camera image while reducing the user's psychological stress.

SUMMARY OF THE INVENTION

However, in the authentication apparatus described in JP-A No. 2003-187235, the space above the area where the user puts his/her finger is open, so external light enters the space from between the guides and the finger and may be reflected by the transparent plate, showing up in a camera image.

Figure 10:
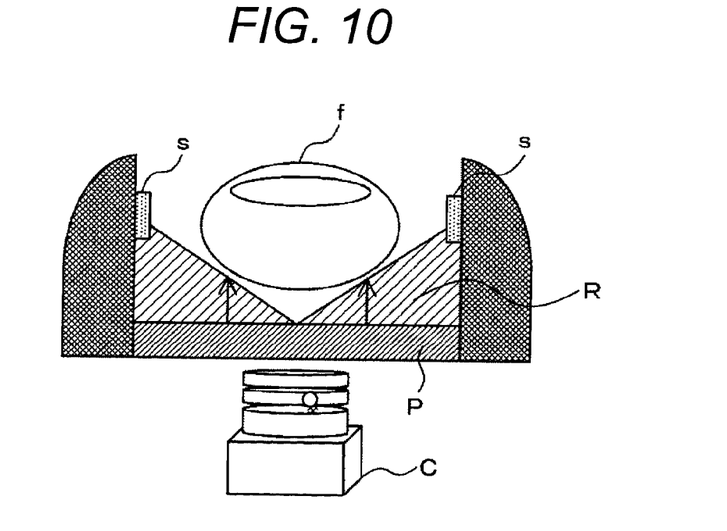
FIG. 10 schematically shows that light is emitted from the light sources of a conventional authentication apparatus (the width of the finger is large)

In addition, since light sources for irradiating the finger are usually provided on the inner side faces of the guides, it is possible that some of the light rays from the light sources are reflected by the transparent plate and the reflect light shows up in a camera image of the user's finger. FIG. 10 schematically shows the authentication apparatus described in JP-A No. 2003-187235 (a sectional view taken transversely of the apparatus).

As illustrated in FIG. 10, in the authentication apparatus described in JP-A No. 2003-187235, as light sources s on the guides located near both sides of a finger f emit light rays such as near-infrared light rays, some of the light rays R are reflected by a reflector plate P located under the finger f and the reflected rays (arrows in the figure) hit the finger f.

As a consequence, when a camera C, located under the reflector plate P (inside the authentication apparatus), takes an image of the ball of the finger f, the image of the pattern of finger veins may be smudgy with the reflected rays (this phenomenon is called "white out") to result in deterioration in personal authentication accuracy. The possibility that this "white out" phenomenon occurs depends on the width of the finger f.

Figure 11:
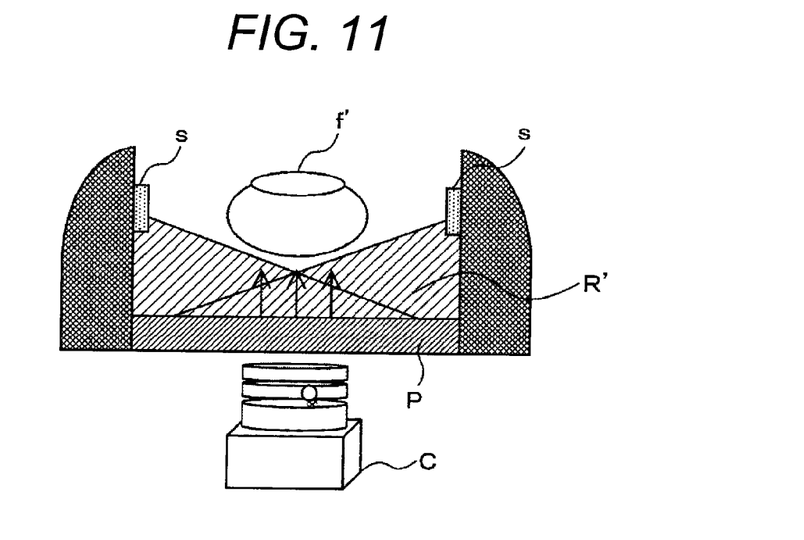
FIG. 11 schematically shows that light is emitted from the light sources of the conventional authentication apparatus (the width of the finger is small)

FIG. 11 shows a case that the finger f', the width of which is smaller than the finger f shown in FIG. 10, is in place. As illustrated in FIG. 11, when the finger f' is in place, the reflector plate P reflects more light rays from the light sources s, which means that the smaller the width of the finger is, the lower the personal authentication accuracy is. In order to prevent deterioration in authentication accuracy depending on the finger width, the quantity of light emitted from the light sources must be controlled taking the finger width into consideration.

In the authentication apparatus described in JP-A No. 2003-187235, there is a gap between the guides and the finger f (f') as mentioned above, external light comes in through this gap. As a result, as when the reflector plate reflects light from the light sources, "white out" may occur in the image of the finger.

Figure 12:
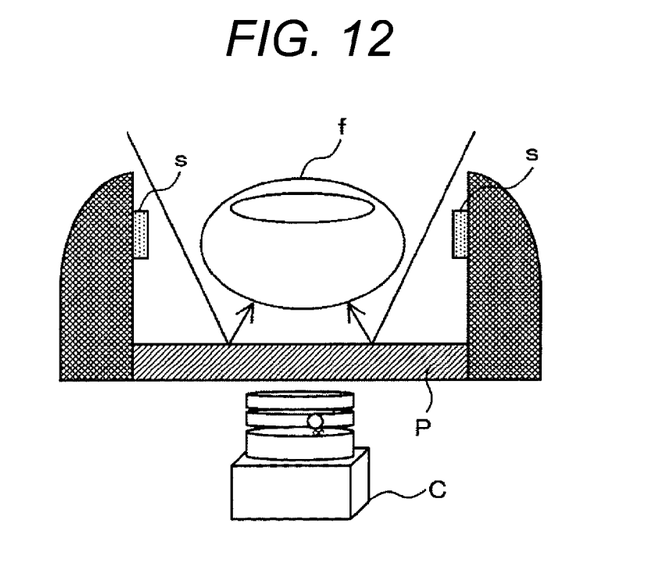
FIG. 12 schematically shows that external light enters the conventional authentication apparatus (when the width of the finger is large)
Figure 13:
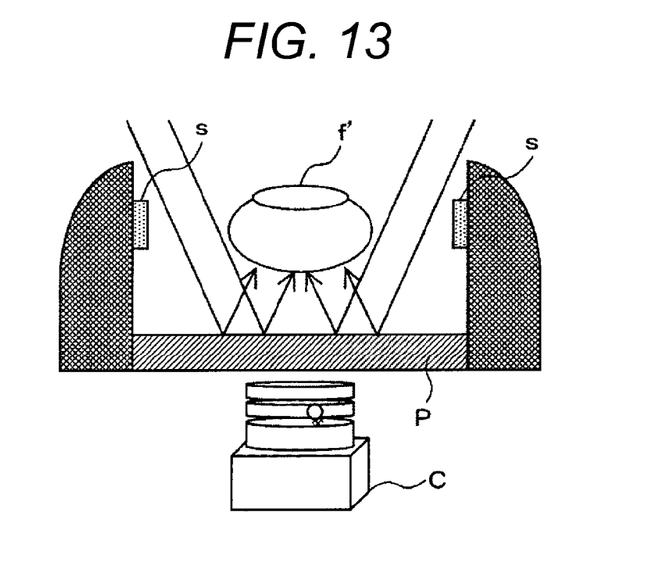
FIG. 13 schematically shows that external light enters the conventional authentication apparatus (when the width of the finger is small).

FIGS. 12 and 13 illustrate that external light is reflected by the reflector plate P, hitting the finger f (f'). In the example of FIG. 13, the width of the finger f' is smaller than the finger f shown in FIG. 12, so more reflected light hits the finger f'.

As stated above, in the authentication apparatus described in JP-A No. 2003-187235, the influence of light from the light sources s for irradiating the finger and external light varies depending on the individual living body (finger width, etc). Therefore, the quantity of light emitted from the light sources must be controlled with the individual difference taken into consideration in order to maintain the personal authentication accuracy constant. In other words, it has a problem that since the influence of light on the living body (photographic subject) is not constant, stability in authentication accuracy is not ensured unless the quantity of light emitted from the light sources is adjusted carefully.

The present invention has been made in view of the above circumstances and has an object to provide a biometric authentication apparatus which ensures stability in authentication accuracy by making the influence of light virtually constant.

In order to achieve the above object, according to one aspect of the present invention, there is provided a biometric authentication apparatus for acquiring information on veins of a user's finger for personal authentication, including: guides which form a space to put the user's finger in and block external light to come into the space sideways; a door assembly which closes when the user's finger is not in place and opens downward by a pushing force of the user's finger when the user's finger is in place, and blocks external light coming from above the space; a light source section disposed on a surface of the door assembly for irradiating the user's finger with light; a filter located at the bottom of the space and has a reflective surface for reflecting external light coming into the space or light emitted from the light source section; and an imaging unit located under the filter for taking an image of veins of the user's finger exposed to the light emitted from the light source section.

According to another aspect of the invention, there is provided a biometric authentication apparatus for acquiring information on veins of a user's finger for personal authentication, including: guides which form a space to put the user's finger in and block external light to come into the space sideways; a light source section disposed on inner surfaces of the guides for irradiating the user's finger with light; a door assembly which closes when the user's finger is not in place and opens downward by a pushing force of the user's finger when the user's finger is in place, and transmits at least light emitted from the light source section; a filter located at a bottom of the space and having a reflective surface for reflecting external light coming into the space or light emitted from the light source section; and an imaging unit which under the filter for taking an image of veins of the user's finger exposed to the light emitted from the light source section.

According to the present invention, it is possible to provide a biometric authentication apparatus which ensures stability in authentication accuracy by making the influence of light virtually constant.

DETAILED DESCRIPTION OF THE PREFERRED EMBODIMENTS

Next, biometric authentication apparatuses according to the preferred embodiments of the present invention will be described in detail referring to the accompanying drawings.

Figure 1:
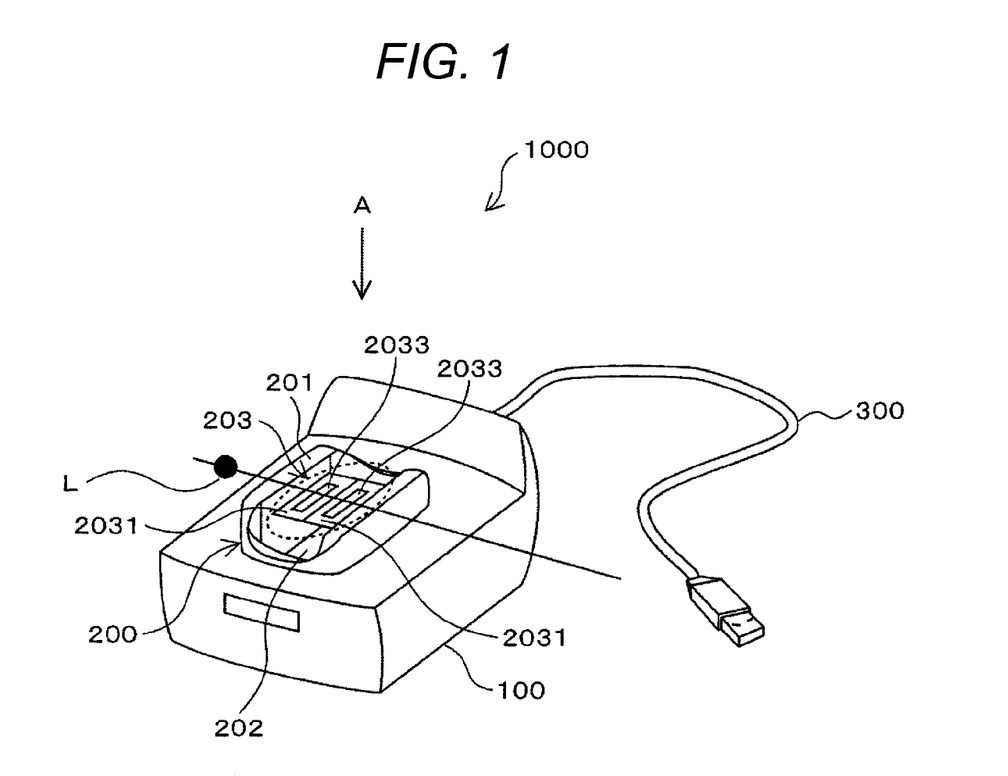
FIG. 1 shows the external appearance of a biometric authentication apparatus according to an embodiment of the present invention.

FIG. 1 shows the external appearance of a biometric authentication apparatus 1000 according to an embodiment of the present invention. As illustrated in FIG. 1, the biometric authentication apparatus 1000 includes a main body 100, a finger rest section 200, and a connector 300. The connector 300 is a cable or the like for connection with various devices which will be described later.

The main body 100 incorporates an imaging unit 101 for taking an image of the finger. The finger rest section 200 includes guides 201, a filter 202, and a door assembly 203.

The biometric authentication apparatus 1000 may be connected with various information processing devices such as a computer (for example, notebook size personal computer) and ATM (automatic teller machine) or may be incorporated in such an information processing device for personal authentication of the user.

Although in the explanation given below it is assumed that the biometric authentication apparatus 1000 is used for personal authentication of the user, it may be used in a different way; for example, an image of the user's finger taken by the imaging unit 101 (which will be described later) is transmitted to an information processing device as mentioned above, the information processing device checks the image for personal authentication and the biometric authentication apparatus 1000 receives the check result.

Figure 2:
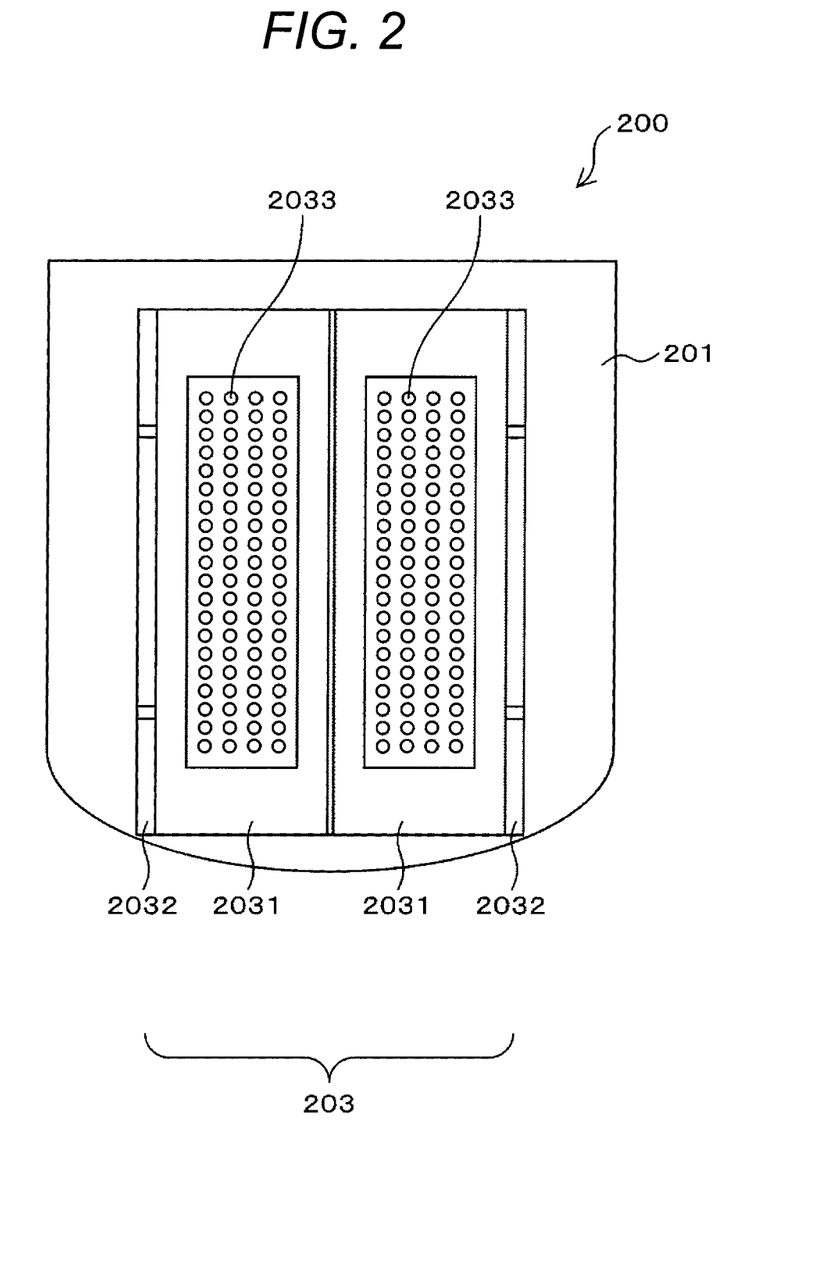
FIG. 2 is a top view of the biometric authentication apparatus shown in FIG. 1 as seen from direction A.

FIG. 2 is a top view showing the finger rest section 200 of the biometric authentication apparatus 1000 shown in FIG. 1 as seen from direction A. As illustrated in FIG. 2, the finger rest section 200 has a space for the finger surrounded on three sides by the guides 201. A pair of doors 2031 is disposed in a way to cover the space from above. The doors 2031 and guides 201 are coupled through hinges 2032 on the inner side surfaces of the guides 201.

Light sources 2033 which emit light of a prescribed wavelength (for example, near-infrared light) are disposed on the front (upper) surface of each door 2031. As illustrated in FIG. 2, the light sources 2033 are arranged in a grid pattern virtually all over the surface of each door 2031. As will be described later, the user is supposed to put his/her finger F on the light sources 2033 disposed on the upper surfaces of these doors 2031 for personal authentication to start personal authentication. Next, details of the main body 100 will be described.

The imaging unit 101 includes an imaging element such as a CCD (charge coupled device) or CMOS (complementary metal oxide semiconductor) and takes an image of the veins of the finger put on the finger rest section 200 through the filter 205 of the finger rest section 200 which will be described later.

Figure 3:
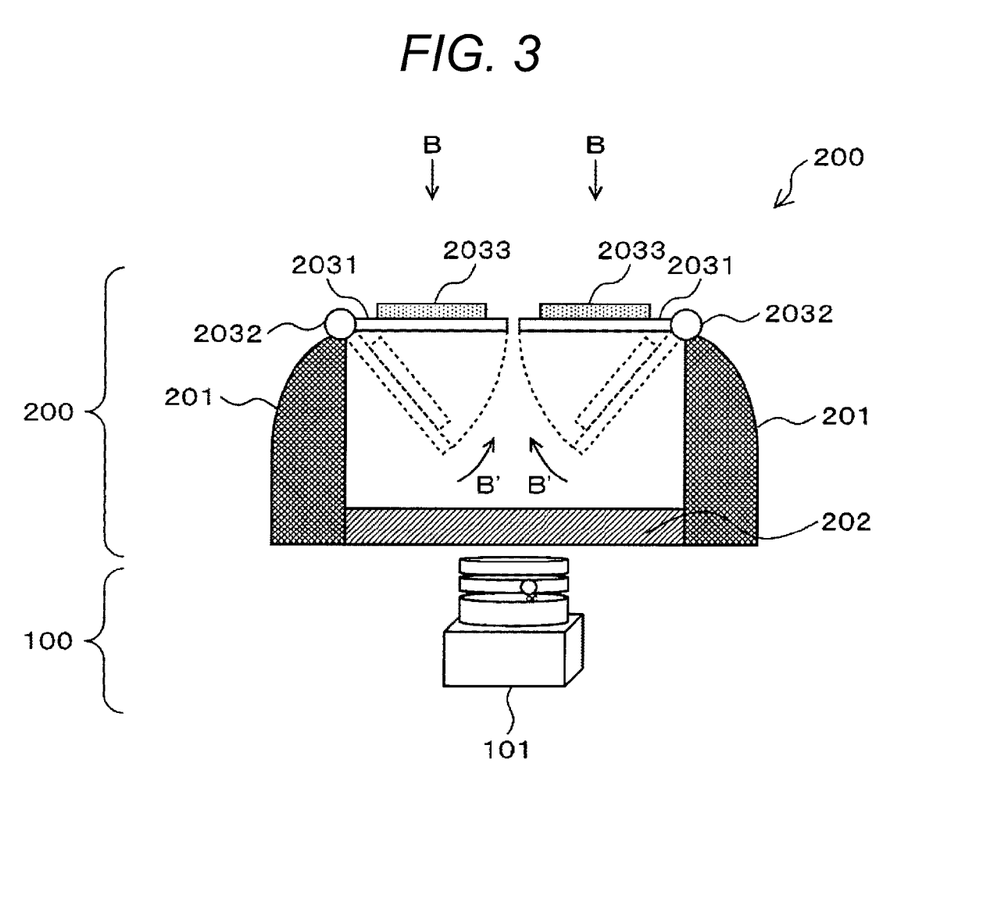
FIG. 3 is a sectional view taken at point L in FIG. 1 showing the finger rest section of the biometric authentication apparatus.

FIG. 3 is a sectional view taken at point L in FIG. 1 showing the finger rest section 200 of the biometric authentication apparatus 1000. As illustrated in FIG. 3, the imaging unit 101 has a lens directed upward and outward from inside the main body 100. The imaging unit 101 takes an image of the veins of the finger F exposed to light emitted from the light sources 2033 arranged on the upper surfaces of the doors 2031 of the finger rest section 200 which will be described later.

A control unit (not shown) which includes an arithmetical unit like a CPU (central processing unit) is used for various control tasks including adjustment of the light level of the light sources 2033 of the finger rest section 200, determination of the time to emit light, determination of the time for the imaging unit 101 to start taking an image, and decision through a touch sensor (not shown), etc. about whether the user's finger has touched the doors 2031.

The control unit (not shown) also compares the image of the finger vein pattern as taken by the imaging unit 101 with a vein pattern image previously stored in a storage medium (not shown) such as a memory and if both coincide with each other, the user is authenticated to a legitimate user. For concrete authentication procedures, there are various known methods. As mentioned above, the control unit (not shown) may be incorporated in the biometric authentication apparatus 1000 (for example, inside the main body 100) or in any of the information processing devices mentioned above. Next, details of the finger rest section 200 will be described.

The guides 201 are intended to prevent the finger placed on the finger rest section 200 from moving from side to side and hold it in a fixed position while blocking external light coming from the lateral sides (transverse and tip directions) of the finger of the user. As illustrated in FIG. 1, the space in which the user can place his/her finger is formed by the guides 201.

The filter 202 is a plastic plate or the like located at the bottom of the space formed by the guides 201. It is a flat plate containing a material which reflects external light (for example, visible light).

The door assembly 203 blocks external light from above which is coming into the space in which the user is supposed to put his/her finger (space surrounded on three sides by the guides 201). As illustrated in FIGS. 2 and 3, the door assembly 203 includes doors 2031, hinges 2032, and light sources 2033, and as will be stated later, when the user puts his/her finger in the space, the finger is irradiated with light of a prescribed wavelength (for example, near-infrared light) with the finger in contact with the light sources.

The doors 2031, intended to prevent external light from entering the abovementioned space, are flat plates (opaque plastic plates or the like). Although in the explanation given below it is assumed that the doors 2031 are opaque, they need not be opaque as long as they block external light.

As will be described later, while the user's finger is not put in the space (not in place), the doors 2031 are closed, and while the user's finger is in place, they open downward by the finger's pushing force.

The hinges 2032 are fasteners which turnably couple the doors 2031 with the guides 201. As illustrated in FIG. 3, the hinges 2032, located at the top of the respective guides 201, couple the doors 2031 with the guides 201 in a way that the doors 2031 open and close with the upper ends (upper edges) of the guides 201 functioning as pivots.

The hinges 2032 each incorporate an elastic member such as a spring which has an elastic force (rotation stress) to return the doors 2031 from their depressed (open) position to their original (closed) position when the doors 2031 are pushed down from above (direction B in FIG. 3). In the example of FIG. 3, when the doors 2031 are pushed down to the position indicated by broken lines, they are biased upward (toward direction B' in FIG. 3) to return from the open position to the closed position.

Figure 4:
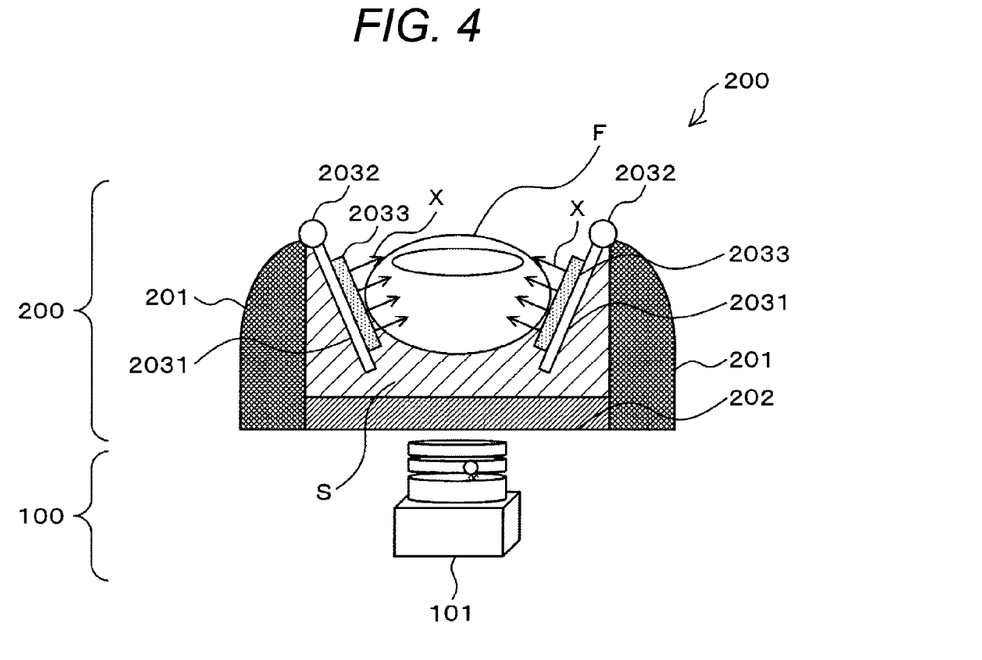
FIG. 4 shows a situation where the doors are pushed down by the user's finger with the upper edges of the guides functioning as pivots (the width of the finger is large)

FIG. 4 shows a situation where the doors 2031 are pushed down with the upper edges (hinges 2032) of the guides 201 functioning as pivots. As illustrated in FIG. 4, when the user's finger F pushes down the doors 2031, the hinges 2032 generate rotation stress in the doors 2031 and the rotation stress in the doors 2031 is balanced with the finger's pushing force against the doors 2031, which brings the finger F into contact with the doors 2031 (more specifically the light sources 2033 on the upper surfaces of the doors 2031) and irradiates the ball of the finger F with light X emitted from the light sources 2033.

Thus the guides 201, doors 2031, filter 202 and user's finger F form a closed space S. This virtually eliminates the possibility that external light enters the closed space S shown in FIG. 4 and prevents a phenomenon that external light reflected by the filter 202 shows up in an image of the finger F taken by the imaging unit 101 and "white out" occurs. In other words, due to the formation of this closed space S, the influence of external light on personal authentication accuracy is virtually constant and the authentication accuracy is stabilized.

Figure 5:
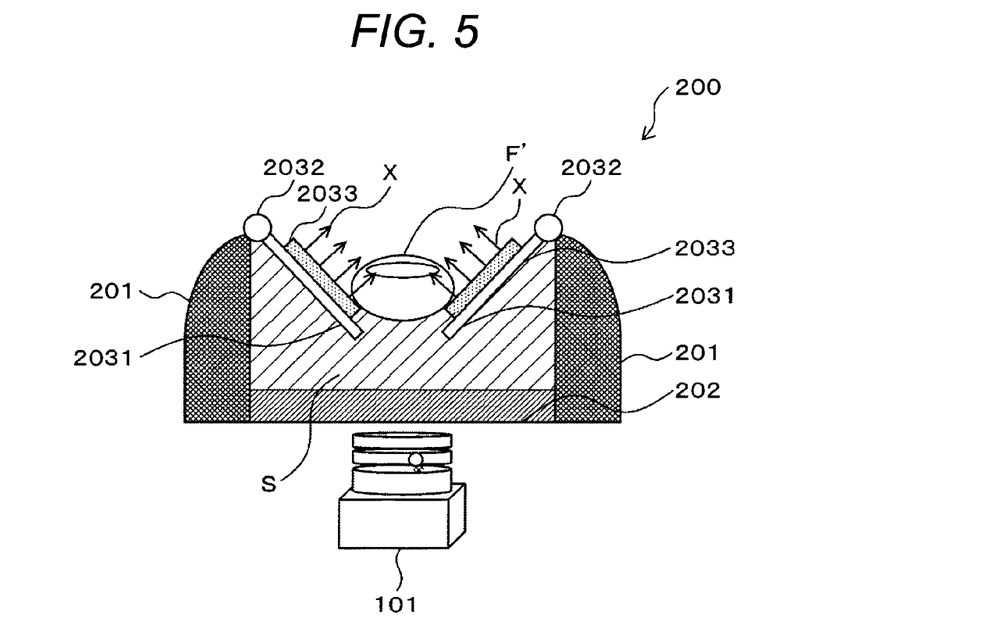
FIG. 5 shows a situation where the doors are pushed down by the user's finger with the upper edges of the guides functioning as pivots (the width of the finger is small)

Since rotation stress is generated in the doors 2031 by the hinges 2032 as mentioned above, there will be no change in external light coming into the closed space S shown in FIG. 4 even when the width of the finger F is different. FIG. 5 shows a situation where a finger F' whose width is smaller than that of the finger F shown in FIG. 4 is in place.

As illustrated in FIG. 5, since the width of the finger F' is smaller, the closed space S is formed as in the situation shown in FIG. 4, though balance with the finger F' is maintained with the doors 2031 more horizontal than those shown in FIG. 4. Therefore, the influence of external light on personal authentication accuracy is virtually constant regardless of the width of the user's finger, etc. (living body individual difference) and the authentication accuracy is stabilized.

In the examples shown in FIGS. 2 to 5, it is assumed that the doors 2031 are wide enough to virtually contact each other. However, the width of each door 2031 need not be so, as long as the doors 2031, guides 201 and filter 202 form a closed space when the user puts his/her finger there.

Figure 6:
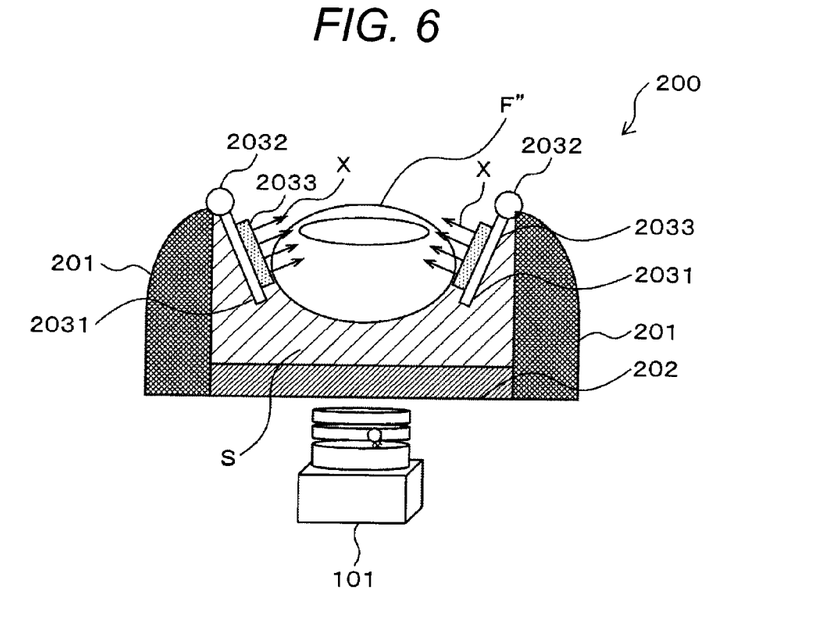
FIG. 6 shows a situation where the distance between the doors is shorter than in the examples shown in FIGS. 2 to 5 (when the doors are pushed down by a finger)

FIG. 6 shows a situation where the distance between the doors 2031 is shorter than in the cases shown in FIGS. 2 to 5 and the doors 2031 are pushed down by a finger F'''. As illustrated in FIG. 6, though the distance between the doors 2031 is shorter than in the cases shown in FIGS. 2 to 5, the finger F''' is in contact with the doors 2031 due to the rotation stress of the hinges 2032. Even in this case, the finger F''', doors 2031, guides 201 and filter 202 form the closed space S, so the influence of external light on personal authentication accuracy is virtually constant and the authentication accuracy is stabilized.

Figure 7:
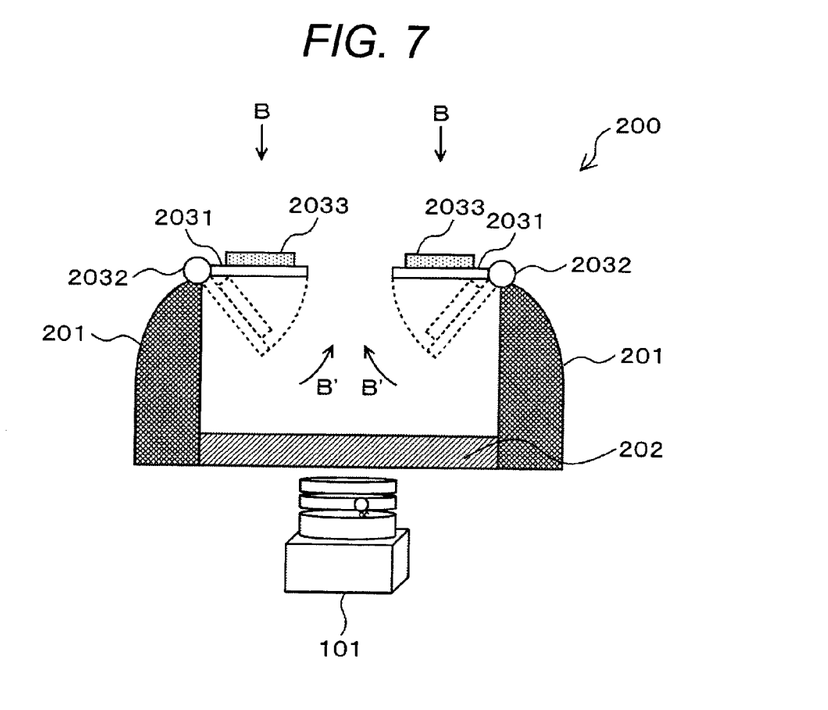
FIG. 7 shows a situation where the distance between the doors is shorter than in the examples shown in FIGS. 2 to 5 (when the doors are not pushed down by a finger)

If the distance between the doors 2031 is short as shown in FIG. 6, there is a clearance between the doors 2031 as illustrated in FIG. 7 when the doors 2031 are in their normal position (not pushed down by the finger), incurring the possibility that dust or dirt may come in through the clearance and accumulate on the filter 202. Such accumulated dust or dirt may show up in an image taken by the imaging unit 101, resulting in deterioration in personal authentication accuracy. For this reason, it is desirable that the doors 2031 be designed to contact each other. When the doors 2031 are designed to contact each other, maintenance work for removal of dust or dirt can be saved. Next, referring back to FIG. 2, the light sources 2033 will be described.

For example, the light sources 2033 are plural LEDs (light emitting diodes) combined with a light source drive (not shown) where the LEDs are arranged at regular intervals (in a grid pattern) on the upper surface of each door 2031 to irradiate the user's finger with light of a prescribed wavelength (for example, near-infrared light). The light sources 2033 constitute two groups of LEDs which make a pair like the doors 2031, each group having LEDs arranged in a grid pattern so that the user's finger is irradiated with light on both its sides uniformly in a balanced manner.

The light sources 2033 are connected with the main body 100 through the hinges 2032 by a given signal line and the light source drive (not shown) receives a control signal from the control unit (not shown) to activate the light sources to emit light.

As illustrated in FIGS. 2 to 7, when the user's finger is put in place, the hinges 2032 generate rotation stress in the doors 2031 and the light sources 2033 on the upper surfaces of the doors 2031 emit light toward the center of the ball of the finger F (slightly upward from the horizontal direction). Therefore, among the light rays emitted from the light sources 2033, the rays entering the closed space S decrease, thereby suppressing the phenomenon that light from the light sources 2033 causes so-called "white out" in an image taken by the imaging unit 101.

Thus, in the biometric authentication apparatus 1000 which acquires information on the veins of the user's finger for personal authentication, the guides 201 form a space in which the user's finger is to be put and block external light going to come into the space sideways, the door assembly 203 closes when the user's finger is not in place and opens downward by the pushing force of the user's finger when the user's finger is in place and blocks external light coming from above the space, the light sources 2033 are disposed on surfaces of the door assembly 203 to irradiate the user's finger with light, the filter 202 lies on the bottom of the space and has a reflective surface to reflect external light coming into the space or light emitted from the light sources 2033, and the imaging unit 101 is located under the filter 202 to take an image of the veins of the user's finger exposed to light from the light sources 2033; consequently the influence of light is virtually constant and the authentication accuracy is stabilized.

In the above embodiment, the hinges 2032 are provided at the upper ends of the guides 201 and rotation stress generated by the hinges 2032 is used to bring the user's finger into contact with the light sources 2033 provided on the upper surfaces of the doors 2031 so that the influence of external light or light emitted from the light sources 2033 is virtually constant. However, since the light sources 2033 are disposed on the upper surfaces of the doors 2031, it is possible that due to dust or dirt accumulation on the light sources 2033, the intensity of light emitted from the light sources 2033 varies depending on the volume of dust or dirt accumulated there and as a consequence, authentication accuracy differs even with the same user's finger. As a solution to this problem, another embodiment of the invention will be described in which there is no influence of dust or dirt on the light sources 2033 and thus authentication accuracy is maintained constant.

Figure 8:
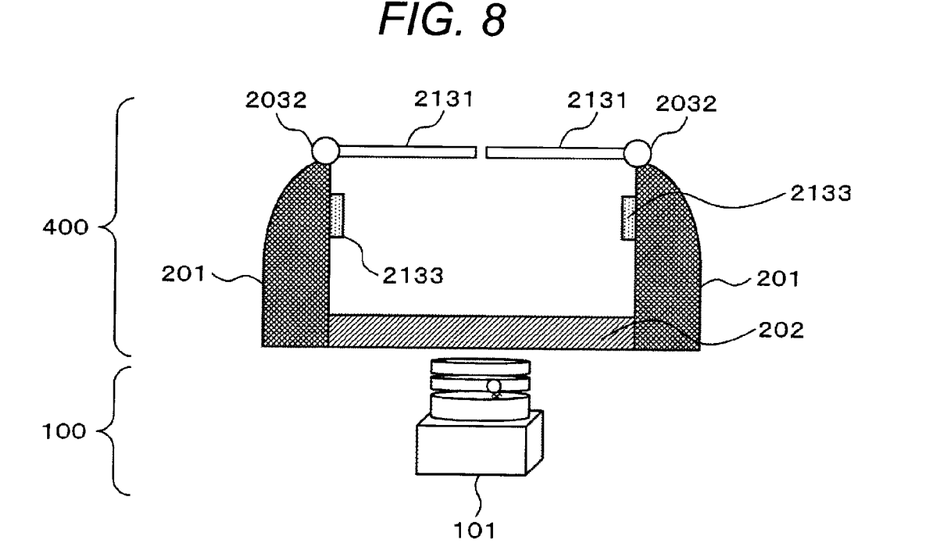
FIG. 8 is a sectional view of a biometric authentication apparatus according to a second embodiment of the invention, taken at point L.

FIG. 8 is a sectional view taken at point L (same as point L on the biometric authentication apparatus 1000 shown in FIG. 1) showing a biometric authentication apparatus 5000. As illustrated in FIG. 8, the biometric authentication apparatus 5000 is different from the biometric authentication apparatus 1000 in that it has a finger rest section 400 different from that in the first embodiment. In the explanation given below, the same elements as those of the biometric authentication apparatus 1000 will be designated by the same reference numerals and their descriptions will be omitted.

As illustrated in FIG. 8, the light sources 2133 in the finger rest section 400 are located on the inner surfaces of the guides 201 unlike the biometric authentication apparatus 1000 in which the light sources 2033 are located on the upper surfaces of the doors 2031.

Figure 9:
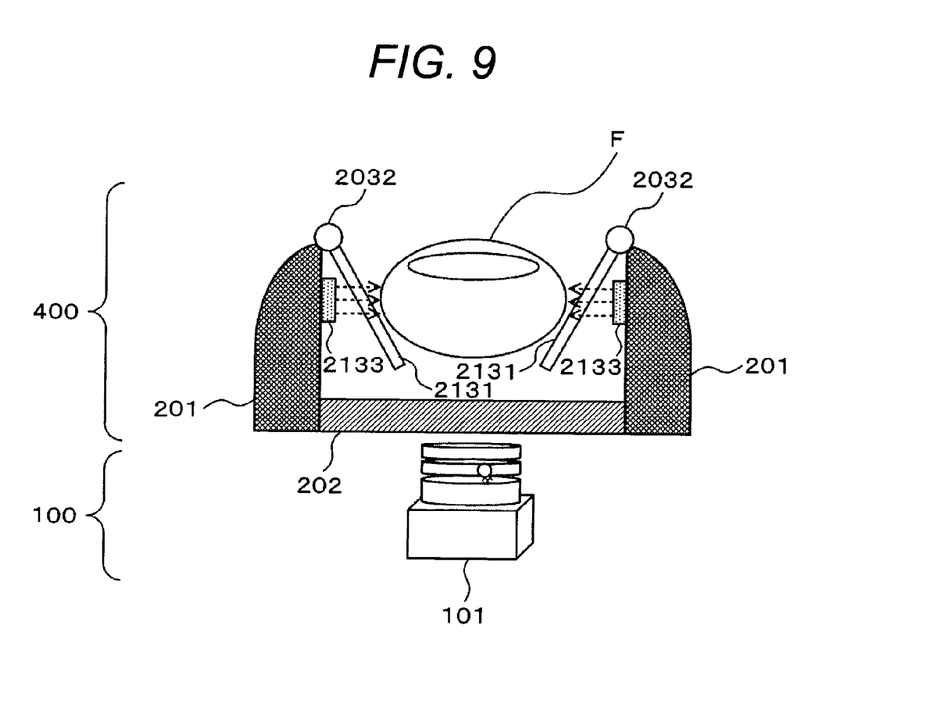
FIG. 9 shows a situation where in the biometric authentication apparatus according to the second embodiment shown in FIG. 8, light emitted from the light sources passes through the doors and the transmitted light hits the user's finger.

The door assembly 213 of the finger rest section 400 includes doors 2131 which are different from the doors 2031 of the biometric authentication apparatus 1000. The doors 2131 have no light sources 2133 on their upper surfaces. The doors 2131 are made of a material which at least transmits light of a prescribed wavelength (for example, near-infrared light) emitted from the light sources 2133. Specifically, as indicated by the broken lines in FIG. 9, as the user's finger F is put in the finger rest section 400 of the biometric authentication apparatus 5000, light emitted from the light sources 2133 located on the inner surfaces of the guides 201 passes through the doors 2131 and the transmitted light hits the user's finger F.

In the biometric authentication apparatus 5000, since the light sources 2133 are located on the inner surfaces of the guides 201, more light is reflected by the filter 202 when it is emitted from the light sources 2133 than when light emitted from the light sources 2033 is reflected by the filter 202 in the biometric authentication apparatus 1000.

However, if the biometric authentication apparatus 5000 is frequently used in an external environment by being connected with an information processing device 2000 such as a notebook size personal computer, the influence of dust or dirt accumulation on the filter 202 on authentication accuracy is more serious than the influence of reflection of light from the light sources 2133 by the filter 202 on authentication accuracy, so the biometric authentication apparatus 5000 may be said to be more effective in preventing deterioration in authentication accuracy for use in an external environment as mentioned above.

Thus, in the biometric authentication apparatus 5000 which acquires information on the veins of the user's finger for personal authentication, the guides 201 form a space in which the user's finger is to be put and block external light to come into the space sideways, the light sources 2133 are disposed on the inner surfaces of the guides 201 to irradiate the user's finger with light, the door assembly 213 closes when the user's finger is not in place and opens downward by the pushing force of the user's finger when the user's finger is in place and transmits at least light emitted from the light sources 2133, the filter 202 lies on the bottom of the space and has a reflective surface to reflect external light coming into the space or light emitted from the light sources 2133, and the imaging unit 101 is located under the filter 202 to take an image of the veins of the user's finger exposed to light from the light sources 2133; consequently, when the apparatus is used in an external environment, deterioration in authentication accuracy is prevented effectively.

The present invention is not limited to the foregoing embodiments and may be embodied in other various ways. For example, although the doors (2031, 2131) can rotate on the upper edges of the guides 201 through the hinges 2032 in the foregoing embodiments, the doors (2031, 2131) may slide horizontally to form the closed space S as mentioned above.

The present invention is not limited to the foregoing embodiments, and at the stage of implementation, it may be embodied with modifications to elements without departing from its spirit and scope. Some of the elements disclosed in the foregoing embodiments may be combined as appropriate to create other embodiments. Some of all the elements shown in the embodiments may be eliminated. Also, elements from different embodiments of the invention may be combined as appropriate.

What is claimed is:

1. A biometric authentication apparatus for acquiring information on veins of a user's finger for personal authentication, comprising:

guides which form a space to put the user's finger in and blocking external light to come into the space sideways;

a door assembly which closes when the user's finger is not in place and opens downward by a pushing force of the user's finger when the user's finger is in place, and blocks external light coming from above the space;

a light source section disposed on a surface of the door assembly for irradiating the user's finger with light;

a filter located at a bottom of the space and having a reflective surface for reflecting external light coming into the space or light emitted from the light source section; and an imaging unit located under the filter for taking an image of veins of the user's finger exposed to the light emitted from the light source section.

2. The biometric authentication apparatus according to claim 1,
wherein the door assembly includes a pair of doors as flat plates; and
wherein the light source section is disposed on upper surfaces of the doors.

3. The biometric authentication apparatus according to claim 1, wherein the light source section includes a plurality of light sources arranged in a grid pattern.

4. The biometric authentication apparatus according to claim 2,
wherein the door assembly further includes a biasing section to allow the door assembly to move from an open position to a closed position and couple the guides with the door assembly; and
wherein each of the doors opens and closes with the biasing section as a pivot.

5. The biometric authentication apparatus according to claim 4, wherein the biasing section includes a pair of hinges having elastic members.

6. The biometric authentication apparatus according to claim 1, wherein the user's finger, the guides, the door assembly, and the filter form a closed space when the user's finger is put in the space formed by the guides.

7. A biometric authentication apparatus for acquiring information on veins of a user's finger for personal authentication, comprising:
guides which form a space to put the user's finger in and blocking external light to come into the space sideways;
a light source section disposed on inner surfaces of the guides for irradiating the user's finger with light;
a door assembly which closes when the user's finger is not in place and opens downward by a pushing force of the user's finger when the user's finger is in place, and transmits at least light emitted from the light source section;
a filter located at a bottom of the space and having a reflective surface for reflecting external light coming into the space or light emitted from the light source section; and
an imaging unit located under the filter for taking an image of veins of the user's finger exposed to the light emitted from the light source section.

8. The biometric authentication apparatus according to claim 7, wherein the door assembly includes a pair of doors as flat plates.

9. The biometric authentication apparatus according to claim 8,
wherein the door assembly further includes a biasing section to allow the door assembly to move from an open position to a closed position and couple the guides with the door assembly; and
wherein each of the doors opens and closes with the biasing section as a pivot.

10. The biometric authentication apparatus according to claim 9, wherein the biasing section includes a pair of hinges having elastic members.

11. The biometric authentication apparatus according to claim 7, wherein the user's finger, the guides, the door assembly, and the filter form a closed space when the user's finger is put in the space formed by the guides.

* * * * *